(12) United States Patent
Sanjive

(10) Patent No.: US 8,549,463 B2
(45) Date of Patent: Oct. 1, 2013

(54) DIE EXPANSION BUS

(75) Inventor: Agarwala Sanjive, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 57 days.

(21) Appl. No.: 13/249,218

(22) Filed: Sep. 29, 2011

(65) Prior Publication Data

US 2012/0084483 A1 Apr. 5, 2012

Related U.S. Application Data

(60) Provisional application No. 61/388,255, filed on Sep. 30, 2010.

(51) Int. Cl.
*G06F 17/50* (2006.01)
*G06F 13/00* (2006.01)
*H05K 7/10* (2006.01)
*G06F 13/36* (2006.01)
*H03K 19/177* (2006.01)

(52) U.S. Cl.
USPC .......... 716/138; 716/110; 716/116; 716/117; 716/118; 716/119; 716/100; 716/300; 716/305; 716/306; 326/37; 326/38; 326/47

(58) Field of Classification Search
USPC ................ 716/110, 116–119, 138; 710/100, 710/300, 305, 306; 326/37–38, 47
See application file for complete search history.

(56) References Cited

U.S. PATENT DOCUMENTS

| | | | |
|---|---|---|---|
| 5,933,611 A * | 8/1999 | Shakkarwar | 710/100 |
| 6,216,183 B1 * | 4/2001 | Rawlins | 710/100 |
| 6,523,081 B1 * | 2/2003 | Karlsson et al. | 710/305 |
| 6,785,873 B1 * | 8/2004 | Tseng | 716/102 |
| 6,993,617 B2 * | 1/2006 | Butcher et al. | 710/305 |
| 6,996,659 B2 * | 2/2006 | Lupien et al. | 710/315 |
| 7,207,014 B2 * | 4/2007 | Velasco et al. | 716/138 |
| 7,353,362 B2 * | 4/2008 | Georgiou et al. | 712/33 |
| 7,743,191 B1 * | 6/2010 | Liao | 710/240 |
| 7,873,068 B2 * | 1/2011 | Klinglesmith et al. | 370/463 |
| 7,917,729 B2 * | 3/2011 | Georgiou et al. | 712/32 |
| 7,934,038 B1 * | 4/2011 | Kao et al. | 710/305 |
| 8,261,128 B2 * | 9/2012 | Lais et al. | 714/43 |
| 2003/0208653 A1 * | 11/2003 | Butcher et al. | 710/306 |
| 2004/0230735 A1 * | 11/2004 | Moll | 710/312 |
| 2004/0236893 A1 * | 11/2004 | May et al. | 710/306 |
| 2005/0021871 A1 * | 1/2005 | Georgiou et al. | 709/250 |
| 2005/0044299 A1 * | 2/2005 | Lin et al. | 710/306 |
| 2006/0010277 A1 * | 1/2006 | Arndt et al. | 710/305 |
| 2007/0027485 A1 * | 2/2007 | Kallmyer et al. | 607/2 |
| 2007/0230217 A1 * | 10/2007 | Sakaki | 362/624 |
| 2010/0271071 A1 * | 10/2010 | Bartley et al. | 326/101 |
| 2012/0036304 A1 * | 2/2012 | Lais et al. | 710/311 |
| 2012/0036305 A1 * | 2/2012 | Lais et al. | 710/313 |
| 2012/0207165 A1 * | 8/2012 | Davis | 370/392 |
| 2013/0009324 A1 * | 1/2013 | Bartley et al. | 257/774 |

* cited by examiner

*Primary Examiner* — Stacy Whitmore

(74) *Attorney, Agent, or Firm* — Robert D. Marshall, Jr.; Wade James Brady, III; Frederick J. Telecky, Jr.

(57) ABSTRACT

A die expansion bus efficiently couples a supplemental portion of a processing system to an original portion of the processing system on a die. The die expansion bus couples bus subsystems of the supplemental portion of the processing system to the bus subsystems of the original portion of the processing system. The original portion of the processing system is arranged to control the data resources of the supplemental portion of the processing system by accessing memory mapped control registers associated with the bus subsystems of the supplemental portion of the processing system.

14 Claims, 4 Drawing Sheets

DIE EXPANSION BUS

CLAIM OF PRIORITY

This application for Patent claims priority to U.S. Provisional Application No. 61/388,255 entitled "MEMORY PROTECTION ARCHITECTURE" filed Sep. 30, 2010, wherein the applications listed above are incorporated by reference herein.

BACKGROUND

In computing applications, a processing system is often designed to meet a specific application, such that cost, speed, power consumption, heat dissipation, and other design factors of the processing system are optimized. However, increased demands for performance of the processing system would often require additional resources that have not been designed into the processing system. Redesigning the processing system often requires substantial chip redesigns and verification schemes that require long design cycle times and new "pinouts." Depending on the complexity of the changes, the time-to-market of a new design may result in being late (or even missing) a target market window for the new processing system.

The problems noted above are solved in large part by a die expansion bus that efficiently couples a custom portion of a design to an original portion of the design. The disclosed die expansion bus couples bus subsystems of the supplemental portion of the processing system to the bus subsystems of the original portion of the processing system. The original portion of the processing system is arranged to control the data resources of the supplemental portion of the processing system by accessing the memory endpoints associated with the bus subsystems of the supplemental portion of the processing system.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
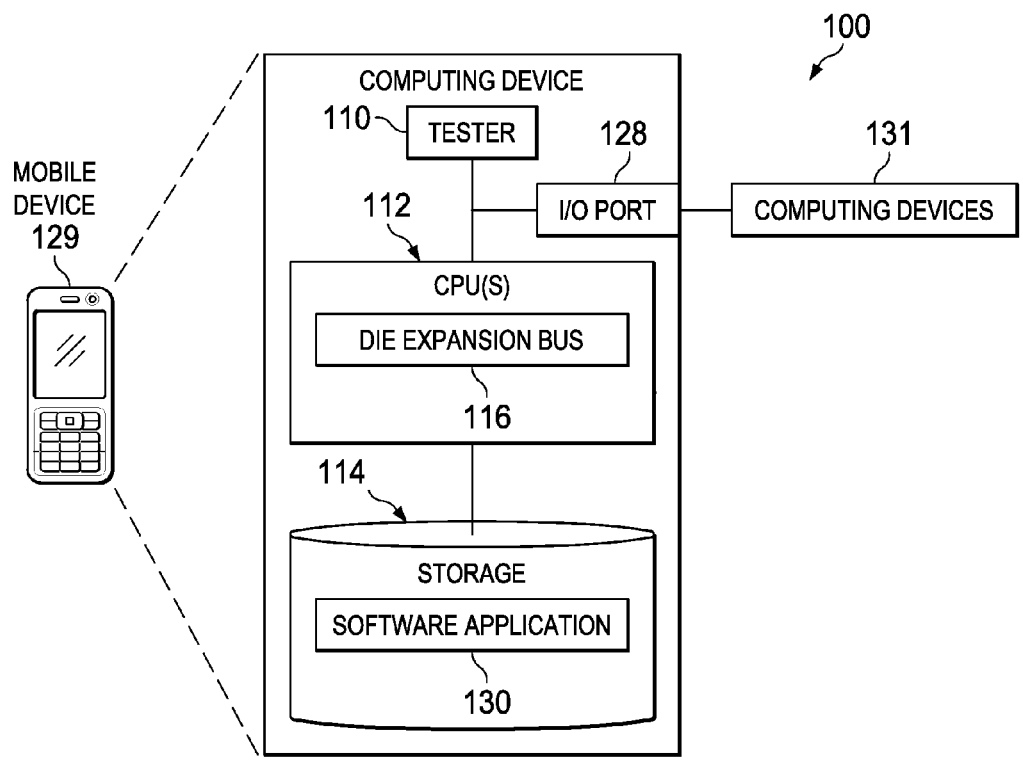
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as SRAM (static RAM), flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 130. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or more die expansion buses 116. The die expansion bus 116 is used to provide a convenient way for interfacing to a supplemental portion of a system that provides additional resources to an original portion of a processing system embodied within the computing system.

The die expansion bus 116 allows a designer to reuse (for example) a previously existing core design (including a substantial portion of the layout thereof) to provide multiple derivative solutions that add new functionality to the original design in a fraction of the time and cost of conventional solutions. The derivative solutions can be offered in the package of the original design that has an identical pinout, which provides customers a "drop-in" replacement to extend functionality of their systems. The die expansion bus allows upgrading proven-design systems-on-chips (SOCs) without substantially disturbing the physical layout, as well as allows upgrading designs at an RTL (register-transistor-logic) level to easily extend the functionality of a complex SOC RTL without substantially impacting the original RTL. Substantial changes are avoided, for example, by allowing relatively minor changes that do not increase design times to the point where conventional solutions are equally as time- and cost-effective.

Disclosed herein are techniques for reducing the processing time that is encountered upgrading original designs by using a die expansion bus to interface to supplemental circuitry. The die expansion bus is a full-function bus architecture that allows for cost-effective, single-chip solutions by enabling the integration of supplemental circuitry (designed by or for a customer for example) with an original design (such as a multi-core SOC provided by a vendor).

The die expansion bus is a low-latency, high-performance extension of the bus infrastructure of the original design. The die expansion bus allows (for example), the supplemental circuitry to access resources of the original design. Accordingly, the supplemental circuitry may also be controlled by the processing cores and/or other resources of the original design. The die expansion bus interface extends existing micro-architectural "hooks" (e.g., control mechanisms) for controlling and supporting functions of the supplemental circuitry such as power management, queue management events, interrupts, reset and system configuration, testing and diagnostics, and clocking.

Figure 2:
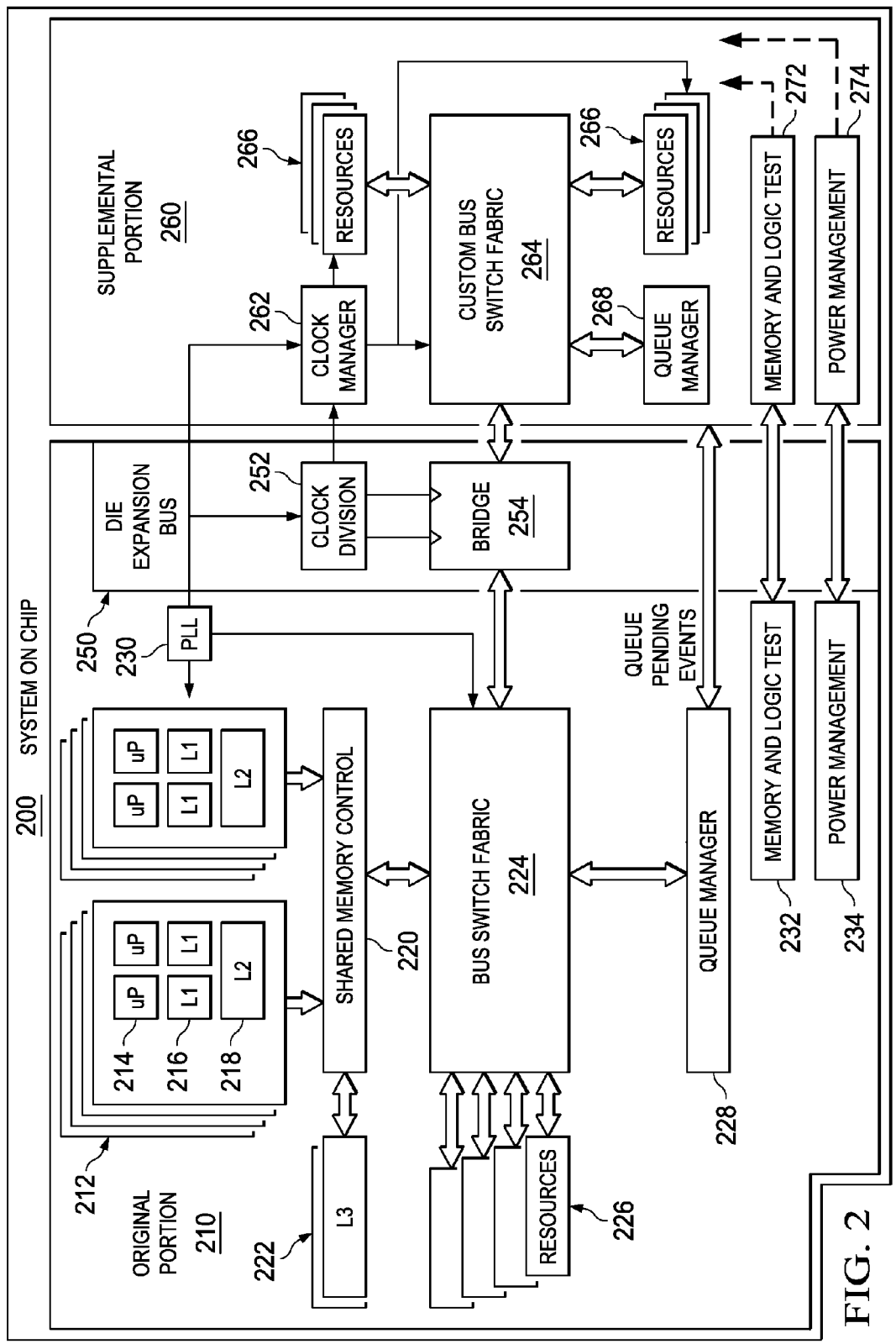
FIG. 2 is a block diagram illustrating a computing system including a die expansion bus in accordance with embodiments of the disclosure.

FIG. 2 is a block diagram illustrating a computing system including a die expansion bus in accordance with embodiments of the disclosure. Computing device 100 of FIG. 1 is illustrated as an SOC 200 that includes an original portion 210, a die expansion bus 250, and a supplemental portion 260. The die expansion bus is arranged to facilitate interfacing arbitrary functions of the supplemental portion 260 with the original portion 210. The original portion 210 provides control, resources, and processing power to be readily used by the supplemental portion 260.

Original portion 210 includes one or more processing cores 212, each of which includes one or more (micro- and/or digital signal) processors (uP) 214 and L1 (level-one) caches 216. Multiple processors 214 and L1 caches 216 can share an L2 (level-two) cache 218. Each processing core 212 communicates with a shared memory control block 220 that is memory controller that arbitrates and controls memory accesses.

The memory accesses are directed towards an L3 (level-three) shared memory as well as the bus switch fabric 224. The bus switch fabric 224 uses direct memory accesses to support high-bandwidth, low-latency internal communications. Bus switch fabric 224 manages communications between resources 226 and the die expansion bus 250, which forwards and receives communications from the supplemental portion 260.

In addition, bus subsystems of the original portion 210 are coupled to the supplemental portion 260 via the die expansion bus 250. For example, clock, test, power management, queue management, interrupt, and other such systems are readily extended to the supplemental portion 260. (In various embodiments, two, three, four, or more of such subsystems are extended to the supplemental portion 260.) The subsystems of both the original portion 210 and the supplemental portion 260 are controlled using "hooks" (e.g., memory mapped endpoints that are associated with controlling a specific function) that are coupled together via the die expansion bus 250.

Queue manager 228 arbitrates requests by processor cores 212 and resources 226 for mutual communication via the bus switch fabric 224. As discussed further below, the queue manager 228 is arranged to work in conjunction with the queue manager 268 of the supplemental portion 260 via die expansion bus 250.

Phase-locked loop (PLL) 230 is a time-base for providing synchronized (and asynchronous) clocks for both the original portion 230 and the supplemental portion 260. The PLL 230 is also used as the time-base for the die expansion bus 250. The die expansion bus 250 interface provides an asynchronous clocking domain crossing bridge 254 that uses a cross-bus protocol to reconcile clock-timing design issues between the original design and the supplemental design. In an embodiment, the PLL 230 provides a single clock source to the die expansion bus 250, where the clock division 252 generates clocks for domain crossing bridge 254, for supplemental portion 260, and for reset distribution.

Clock manager 262 of the supplemental portion 260 receives clock signals from the PLL 230 and/or clock division 252 that are used to clock the custom bus switch fabric 264 and the resources 266. Resources 266 can operate asynchronously with respect to the resources 226 of the original portion because of the domain crossing bridge 254. Resources 266 are controlled by the processing cores 212 and work in conjunction with resources 226 using mutual communication via the bus switch fabric 224, die expansion bus 250, and the custom bus switch fabric 264. The resources 266 provided in the supplemental portion are configurable to provide additional processing power for existing functions and/or to provide additional functions.

The queue manager 268 of the supplemental portion 260 handles arbitration of contention for the custom bus switch fabric 264 by resources 266. The queue manager 268 also works in conjunction with the queue manager 228 to handle queue pending events that require traversing the domain crossing bridge 254.

Memory and logic test 232 unit is arranged to verify memory and functional block of the original portion 210 in accordance with test policies, including built-in-self-test mechanisms. The memory and logic test 232 block extends the test policies by communicating (via the die expansion bus 250) with the memory and logic test 272 of the supplemental portion. Thus, the testing and verification of the functionality and structure of the supplemental portion 260 are integrated seamlessly into the existing verification procedures for the original portion (without requiring rework of the existing verification procedures, for example).

Power management 234 unit is arranged to manage power of the original portion 210 in accordance with various operational modes (such as "active," "listening," low-voltage," "power-save," "sleep," "hibernate," modes, and the like). Thus, various functional blocks of the original portion 210 are powered over time with variously applied operating voltages. The die expansion bus is arranged to couple control signals used by power management 234 unit to the power management 274 unit of the supplemental portion 260. Thus, the various functional blocks of the supplemental portion 260 are powered over time with variously applied operating voltages in accordance with the power management schemes and modes of the original portion 210.

Figure 3:
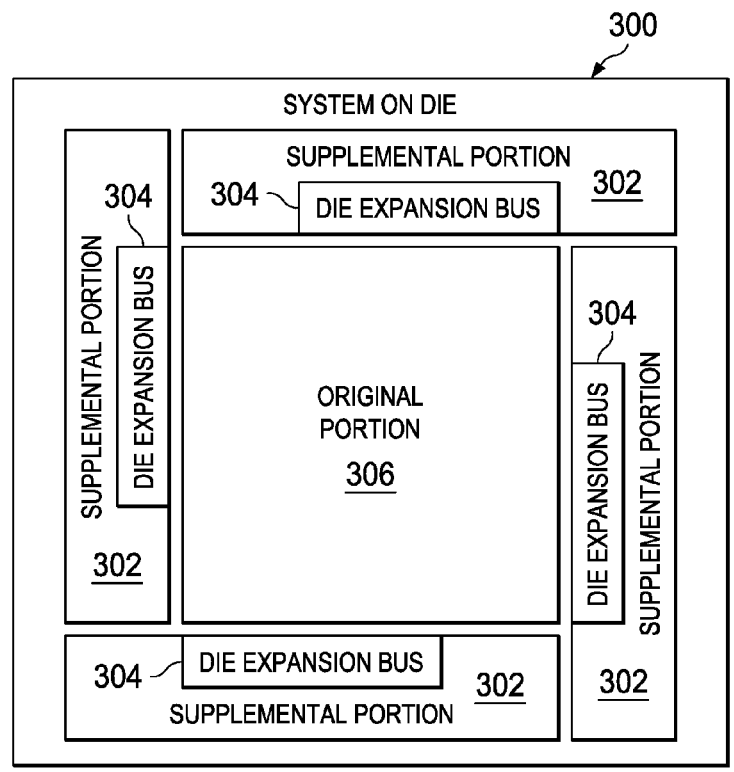
FIG. 3 is a block diagram illustrating a layout of a plurality of die expansion buses in accordance with embodiments of the disclosure.

FIG. 3 is a layout diagram illustrating a physical layout of a system on die in which die expansion buses are arranged in accordance with embodiments of the disclosure. System on die 300 includes an original portion 306 in a relatively central portion of the die. The relatively central portion of the die is, for example, includes an area geographically distributed around a central point of the die in which the system on die 300 is arranged.

A plurality of die expansion busses 304 are arranged around the periphery of the original portion 306 of the processing system. The plurality of die expansion busses 304 are arranged to couple bus subsystems (e.g., such as described above with respect to FIG. 2) of a plurality of supplemental portions 302 of the processing system to the bus subsystems (also described above) of the original portion 306 of the processing system. In the embodiment, the plurality of supplemental portions 302 of the processing system are arranged around the periphery of the original portion 306 of the processing system and are arranged to be adjacent to an associated (e.g., contiguously arranged) die expansion bus 304. Accordingly, the routing of signals from the original portion 306 to the supplemental portion 302 is facilitated when a portion of an associated die expansion bus 304 lies between a location in the original portion 306 and a location in the supplemental portion 302.

Figure 4:
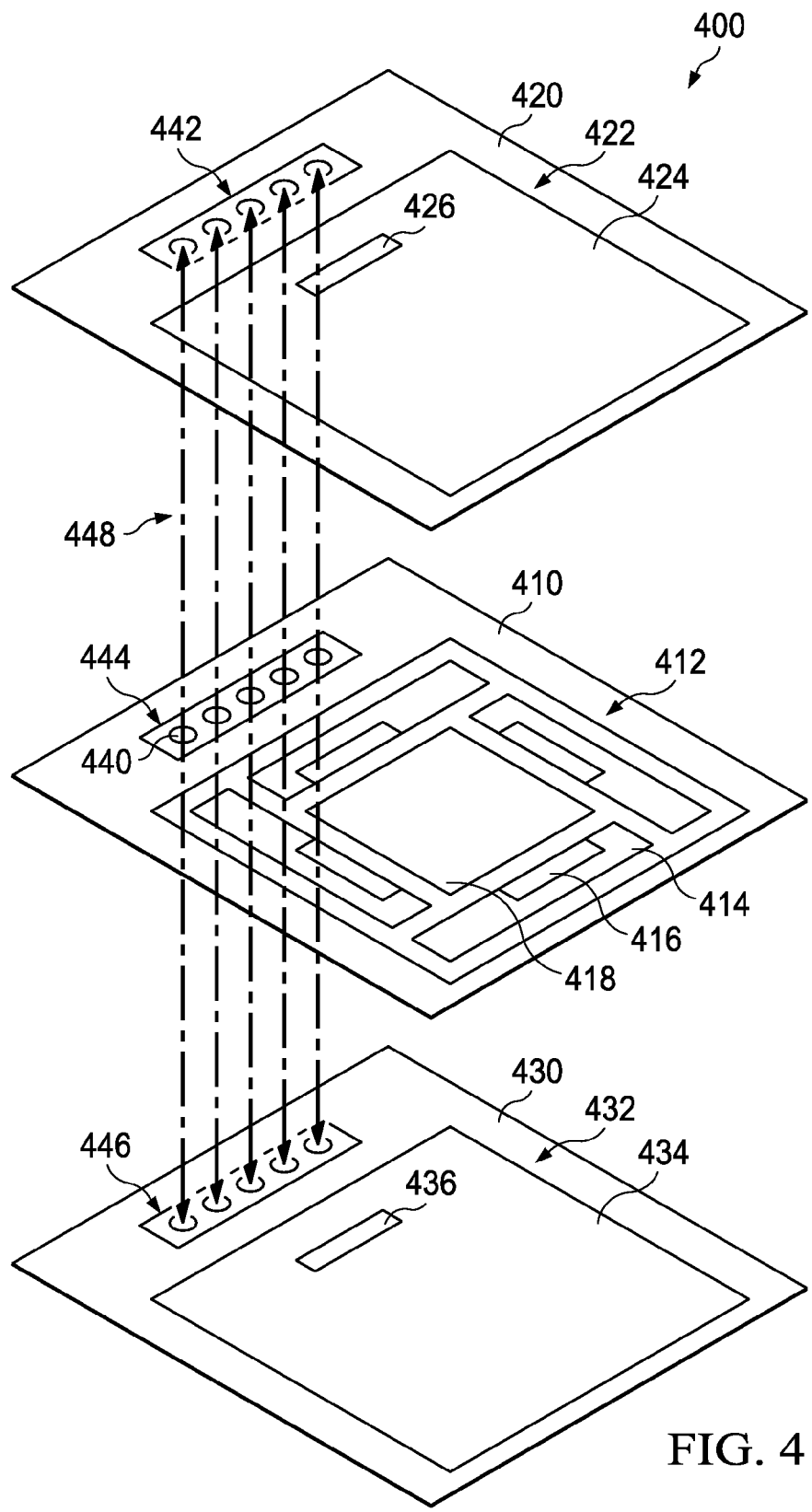
FIG. 4 is a block diagram illustrating a stacked die arrangement in accordance with embodiments of the present disclosure.

FIG. 4 is an exploded view of a physical layout that illustrates a system on die in which die expansion buses are arranged in a stacked die configuration in accordance with embodiments of the disclosure in accordance with embodiments of the present disclosure. Stacked die system 400 includes die 410, die 420, and die 430 in a die stack (when assembled). Die 410 includes a layout 412 that includes an original portion 418, and at least one supplemental portion 414 that is arranged to be adjacent to an associated die expansion bus 416. Die 410 also includes an inter-die signal coupling structure 444 that includes signal contacts 440 for coupling signals 448 from one stacked die to an adjacent stacked die (when assembled in a die stack). The inter-die signal coupling structure 440, for example, includes through-silicon-vias for coupling signals 448 from signal contacts 440 on one side of a stacked die to the opposing side of the stacked die.

Die 420 includes a layout 422 that includes an at least one supplemental portion 424 that is arranged to be adjacent to an associated die expansion bus 426. Die 420 also includes an inter-die signal coupling structure 442 that includes signal contacts 442 for coupling signals 448 from die 410 to the die 420 (when assembled). The inter-die signal coupling structure 442, for example, includes signal contacts 442 for coupling signals 448 to the signal contacts of 444 on the facing side of the die 410.

Die 430 includes a layout 432 that includes an at least one supplemental portion 434 that is arranged to be adjacent to an associated die expansion bus 436. Die 430 also includes an inter-die signal coupling structure 446 that includes signal contacts 440 for coupling signals 448 from die 410 to the die 430 (when assembled). The inter-die signal coupling structure 446, for example, includes signal contacts 440 for coupling signals 448 to the signal contacts of 440 on the facing side (bottom side, as illustrated) of the die 410. Accordingly, through-silicon-vias (TSVs) and/or contacts 440 allow resources of supplemental portion 424 (on die 420 using die expansion bus 426) to communicate with resources of the original portion 418 (on die 410) or the resources of the supplemental portion 414 (on die 410 using die expansion bus 416). Further, resources of supplemental portion 424 (on die 420) use the TSVs to communicate with resources of the resources of the supplemental portion 434 (on die 430 using expansion bus 436). The communications between different die of a die stack communicate at a native clock speed of a processor in the die stack (as compared to using a slower bus clock for driving pads having relatively high levels of capacitance, inductance, and/or resistance).

Figure 5:
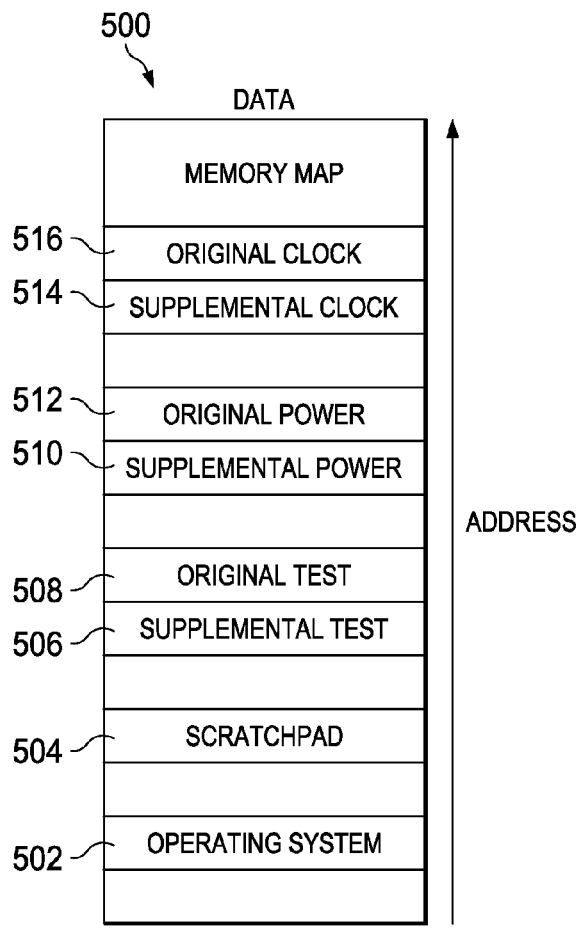
FIG. 5 is a block diagram illustrating a memory map for controlling a supplemental portion of a circuit using a die expansion bus in accordance with embodiments of the present disclosure.

FIG. 5 is a block diagram illustrating a memory map for controlling bus subsystems in accordance with embodiments of the present disclosure. Memory map 500 illustrates portions of memory (not all of which are resident in L3 memory, for example) that have different purposes and are located in different addresses in memory. For example, an operating system 502 and scratchpad memory 504 are each resident in an area of memory accessed by addresses that are unique in the memory map. Control registers for controlling bus subsystems are also included in the memory map 500.

As discussed above, processing cores 212 and resources 226 communicate via bus switch fabric 224. The memory map 500 includes addresses that, for example, are unique to individual processing cores 212, L3 memory, and resources 226. Die expansion bus 250 is arranged to expand the memory map such that resources 266 and control registers for bus subsystems of the supplemental portion 260 are encompassed by the memory map.

Memory map 500 is arranged to control bus subsystems through writing directly to memory endpoints (e.g., memory mapped control registers). For example, the clocking bus subsystem of the original portion (Org. Clock) 516 is controlled by writing data to the address at which Org. Clock 516 resides. Likewise, the power management bus subsystem of the original portion (Org. Power) 512 is controlled by writing data to the address at which Org. Power 512 resides, and the bus subsystem for test of the original portion (Org. Test) 508 is controlled by writing data to the address at which Org. Test 508 resides. Other bus subsystems (such as managers for interrupts, operational modes, and the like) of the original portion are similarly controlled by writing data to addresses that are associated with corresponding bus subsystems.

As mentioned above, die expansion bus 250 is arranged to expand the memory map such that resources 266 and control registers for bus subsystems of the supplemental portion 260 are encompassed by the memory map. For example, the clocking bus subsystem of the supplemental portion (Supp. Clock) 514 is controlled by writing data to the address at which Supp. Clock 514 resides. Likewise, the power management bus subsystem of the supplemental portion (Supp. Power) 510 is controlled by writing data to the address at which Supp. Power 510 resides, and the bus subsystem for test of the supplemental portion (Supp. Test) 506 is controlled by writing data to the address at which Supp. Test 506 resides. Other bus subsystems (such as managers for interrupts, operational modes, and the like) of the supplemental portion are similarly controlled by writing data to addresses that are associated with corresponding bus subsystems.

Figure 6:
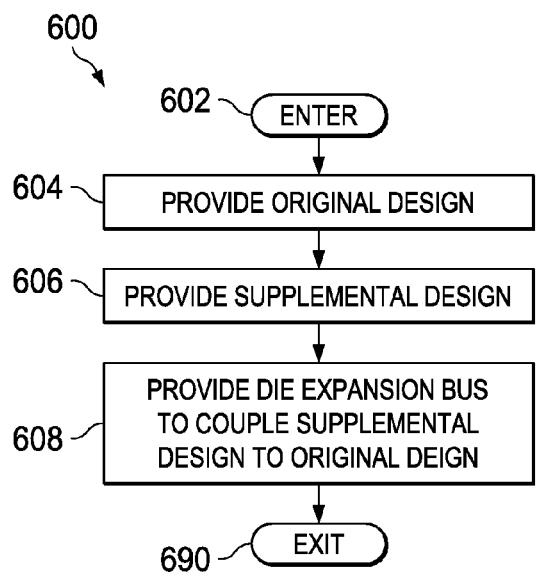
FIG. 6 is a process diagram illustrating forming a die expansion bus in accordance with embodiments of the present disclosure.

FIG. 6 is a process diagram illustrating updating processing system designs on integrated circuits in accordance with embodiments of the present disclosure. Process 600 is entered at node 602 and proceeds to function 604. At function 604, an original design is provided. The design can be provided in different forms such as a physical layout or in abstracted form such RTL or a high-level design language. The original design typically includes processors, a hierarchical memory system, resources and a switching matrix to couple the various components of the original design together. Various bus subsystems are provided such as clocking, power management, testing, interrupt management (and the like) that control operation of the original design.

In function 606, a supplemental design is provided. Often, the requirements for different applications evolve and/or requirements for differing product price-points involve different levels of processing power (and concomitant power consumption). The supplemental portion contains the additional resources, memory, processors, switching matrix and the like (as well as the bus subsystems for managing those resources) that are provided to tailor the original design in accordance with the new and/or different design requirements.

In function 608, a die expansion bus is provided to couple the supplemental design to the original design. The die expansion bus couples the clock subsystem of the original design to the supplemental portion such that, for example, clocking of the supplemental portion is controlled by a memory endpoint (such as a control register) that is mapped to (and located in) the supplemental portion.

The die expansion bus couples the bus switch fabric of the original design to the custom bus switch fabric of the supplemental portion. For example, the die expansion bus contains a domain-crossing bridge that allows asynchronous transfers of data (from differing clock domains) between the original and supplemental designs. A queue manager in each of the original and supplemental designs communicate across the die expansion bus to arbitrate and coordinate pending events of the various components (in each of the original and supplemental designs) that use the bus switch fabric and the custom bus switch fabric.

The die expansion bus also couples the memory and logic test bus subsystem of the original design to the memory and logic test bus subsystem of the supplemental portion. For example, the memory and logic test bus subsystem scheme (such as a serial scan test bus) for the original design is extended to the supplemental design so that test policies and coverage are similar between the original and supplemental designs.

The die expansion bus also couples the power management bus subsystem of the original design to the power management bus subsystem of the supplemental portion. For example, operating voltages and power-saving schemes of the original design is extended to the supplemental design so that operating voltages and power-saving schemes can be selectively applied across between the original and supplemental designs. The original and supplemental designs are individually controllable so that the original and supplemental designs can be operating at different voltages and/or power-saving modes at the same time (or different times).

The die expansion bus is optionally located around the outside or periphery of a layout to facilitate expansion of the processing power of the original design by the supplemental design. Arranging the supplemental portion in the periphery of the design allows for relatively unconstrained designed footprints of the supplemental portion.

The die expansion bus is also routable to stacked dies (including a supplemental design, but not the original design, for example) so that the inter-die communication can proceed at processor speeds (as compared to slower clock speeds that are used to clock bus signals to multi-chip modules, for example). The signals of the die expansion bus can be routed to multiple dies in a stack using through-silicon vias, for example.

In function 690, the process exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for updating a processing system design on a first integrated circuit into a at least one updated processor design on respective second integrated circuits, comprising:
    arranging an original processing system design in a substrate in accordance with a substantially fixed layout, wherein the original processing system design includes original data resources for processing data and includes bus subsystems having first memory mapped control registers for controlling the data resources of the original processing system design and second memory mapped control registers for controlling data resources not of the original processing system design, the original processing system design further including a die expansion bus coupled to the bus subsystems and adapted to couple to supplemental bus systems of a supplemental processing system;
    constructing a first integrated circuit with the original processing system design;
    arranging at least one updated processing system design in a substrate including the original processing system design and a supplemental processing system design with a substantially fixed layout, wherein the supplemental processing system design includes supplemental data resources for processing data and includes supplemental bus subsystems having at least one of the second memory mapped control registers for controlling the data resources of the supplemental processing system, the supplemental bus subsystems arranged to couple to the die expansion bus wherein the original processing system design is operable to control the supplemental data resources of the supplemental processing system design by accessing a corresponding secondary memory mapped control registers associated with the supplemental bus subsystems of the supplemental processing system design, and wherein the layout of the supplemental processing system design is generated after the layout of the original processing system design has been substantially fixed; and
    constructing at least one second integrated circuit with a corresponding supplemental processing system design.

2. The method of claim 1, wherein the substantially fixed layout of the original processing system design is provided as a standard cell for integrated circuit design.

3. The method of claim 1, wherein the original bus subsystem is a clocking system that provides first memory mapped control registers for selecting clock signals.

4. The method of claim 1, wherein the original bus subsystem is a power management system that provides first memory mapped control registers for applying various levels of system power to selected resources.

5. The method of claim 1, wherein the original bus subsystem is a verification system that provides first memory mapped control registers for providing test stimulus to and reading test results from the selected resources.

6. The method of claim 1, wherein:
    said step of arranging the original processing system design further comprising arranging a plurality of die expansion busses around the periphery of the original processing system design, wherein the plurality of die expansion busses are arranged to couple supplemental bus subsystems of a plurality of supplemental processing system designs to the original bus subsystems.

7. The method of claim 6, wherein:
    said step of arranging the updated processing system design further comprising arranging the plurality of supplemental processing system designs around the periphery of the original processing system design and adjacent to an associated die expansion bus.

8. The method of claim 1, wherein:
said step of arranging at least one updated processor system design further comprising coupling the supplemental processing system design that is located on a first die of a die stack to the original processing system design that is on a second die of the die stack using through-silicon-vias (TSVs).

9. The method of claim 1, wherein:
said step of arranging at least one updated processor system design further comprising queuing pending events for transferring data across a bus switch fabric of the original processing system design and a bus switch fabric of the supplemental processing system design.

10. The method of claim 1, wherein:
the die expansion bus includes a cross-domain bridge to couple the bus switch fabric of the original portion of the processing system to the bus switch fabric of the supplemental original portion.

11. The method of claim 10, comprising
transferring data asynchronously across the cross-domain bridge.

12. The method of claim 1, comprising generating a clock in the original portion of the processing system, dividing the clock in the die expansion bus, and receiving the divided clock in the supplemental portion of the processing system.

13. A system on chip, comprising:
an original processing system arranged in a substrate in accordance with a substantially fixed layout, wherein the original processing system includes data resources for processing data and includes bus subsystems having first memory mapped control registers for controlling the data resources of the original portion of the processing system and second memory mapped control registers adapted for controlling data resources not of the original processing system;
a die expansion bus arranged in the substrate, the die expansion bus coupled to to the bus subsystems of the original processing system and adapted to couple to supplemental bus systems of a supplemental processing system, and wherein the original processing system is arranged to control data resources of the supplemental processing system by accessing the second memory mapped control registers associated with the supplemental bus subsystems of the supplemental processing system.

14. The system of claim 13, wherein the is operable to connect to a second die of a die stack using through-silicon-vias (TSVs).

* * * * *